United States Patent [19]

Tuerk

[11] 4,231,606

[45] Nov. 4, 1980

[54] PICKUP TRUCK STAKE ARRANGEMENT

[76] Inventor: Robert P. Tuerk, 7710 Candlewood La., Indianapolis, Ind. 46250

[21] Appl. No.: 968,378

[22] Filed: Dec. 11, 1978

[51] Int. Cl.³ .............................................. B60P 7/06
[52] U.S. Cl. ..................................... 296/43; 105/380; 280/143
[58] Field of Search ..................... 296/36, 43; 105/378, 105/380; 280/143, 147

[56] References Cited

U.S. PATENT DOCUMENTS

| 3,460,864 | 8/1969 | Piercy | 296/43 |
| 3,811,724 | 5/1974 | Woodward | 296/43 |
| 4,067,601 | 1/1978 | Tuerk | 296/43 |

Primary Examiner—John J. Love
Assistant Examiner—John A. Carroll
Attorney, Agent, or Firm—Woodard, Weikart, Emhardt & Naughton

[57] ABSTRACT

A delta stake arrangement adaptable for enclosing pickup truck beds of differing length and of differing layout of the stake pockets around the raised side walls of the truck bed. The arrangement includes a plurality of delta stakes having tapered bottom ends removably seated in the pockets. A plurality of brackets are provided each defining at least a lateral groove therein for receipt and support of a wall enclosure panel. Each bracket is further either formed integral with the delta stake or equipped with at least one dovetail ridge extending along a portion of the length thereof and being slidably received within a plurality of corresponding dovetail slots formed in the wide wall of each delta stake, these slots being parallel and extending along at least a portion of the length of each stake. The dovetail ridge on each bracket is further interchangeably received within the plurality of dovetail slots in the delta stake to vary the position of the bracket and its panel-supporting groove(s) with respect to the stake and thereby adapt for enclosing truck beds of differing length and differing pocket layout. Also provided are plastic plugs press-fitted into the tapered bottom ends of the delta stakes, each plug having a downwardly extending projection for insertion into the drain hole in the bottom of a truck bed pocket to better support and stabilize the delta stake therein.

23 Claims, 21 Drawing Figures

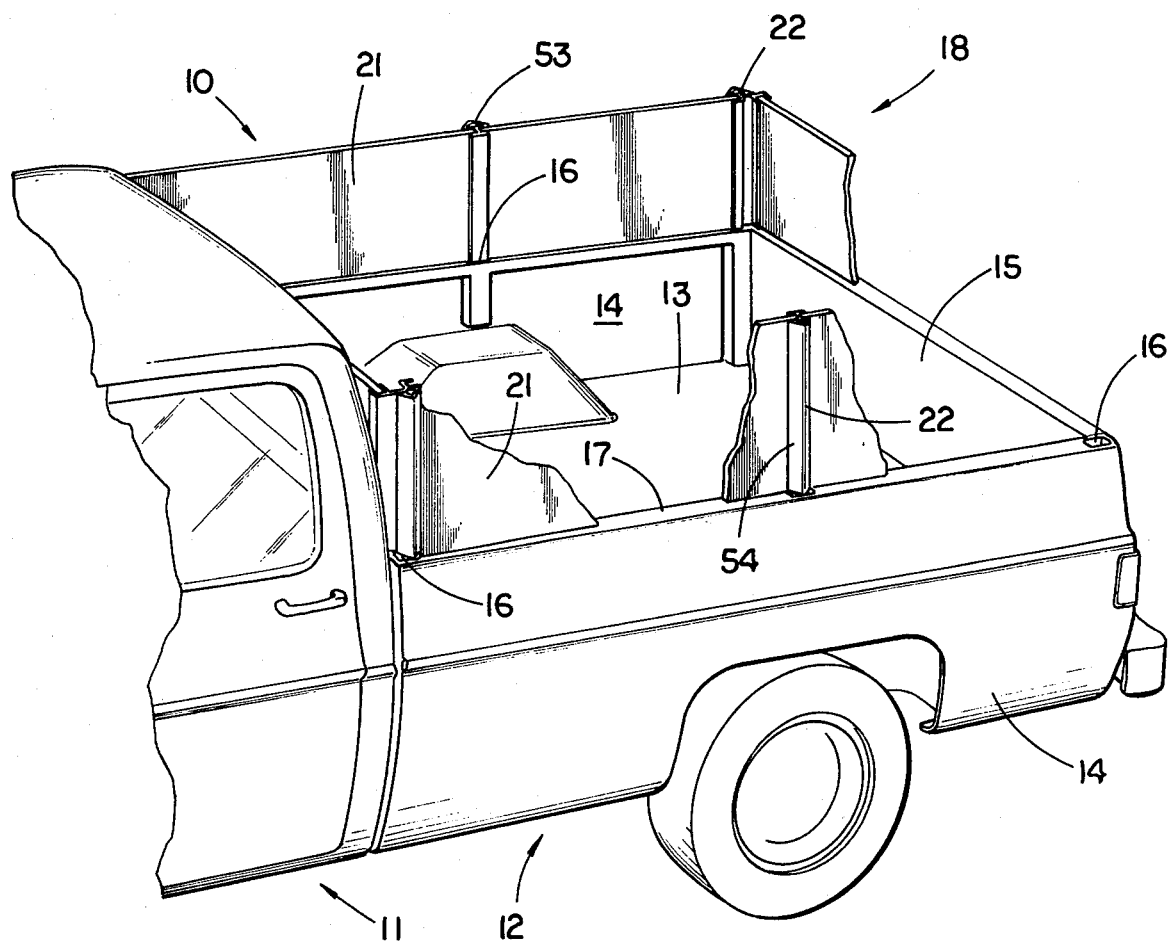
FIG. 1
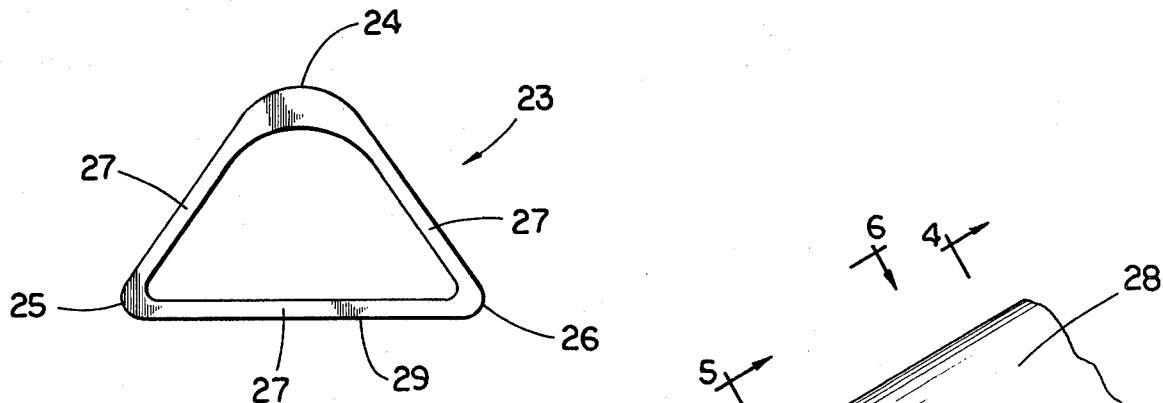
FIG. 2
FIG. 3

PICKUP TRUCK STAKE ARRANGEMENT

BACKGROUND OF THE INVENTION

This invention relates to the field of pickup trucks and, particularly, to an improved stake arrangement adaptable to enclose pickup truck beds of differing length and differing side wall pocket layout.

Truck stake arrangements have gained increasing interest over the years as the use of trucks of all kinds for both personal use and cargo transportation has ever broadened. For the most part, this concern has centered around large eighteen-wheel flatbed trucks used for cross country transportation of a great variety of articles from feed grains to heavy machinery. In this regard, the need existed for a truck stake arrangement that was easy to install and take down, was lightweight for storage, and was structurally capable of supporting both wall panels and a tarpaulin roof against the force of sliding or shifting cargo of varying weight. Carter, Jr. et al., U.S. Pat. No. 3,126,224 discloses an early convertible trailer stake arrangement designed to fit these needs.

Over the years, many improvements and changes have been made in these truck stake arrangements. For example, Woodward, U.S. Pat. No. 3,811,724, discloses a removable two-part stake for a flatbed cargo-carrying vehicle including the basic rectangular cross-sectional stake and a wall having a T bar slidably received within a single slot on the stake to support the upright edge of a wall panel. Glassmeyer et al., U.S. Pat. No. 4,042,275, on the other hand, discloses a complicated stake post and cap arrangement for the trailer of a highway vehicle. The construction of the stake itself in Glassmeyer et al. is such that an inboard and an outboard member each dovetail together to form a wall-supporting stake, the tarpaulin-supporting cap then inserting into the upper opening in the stake.

By far, one of the more important improvements in truck stake design was the development of the delta, or triangular cross section, stake first patented by Tuerk on Sept. 19, 1972, U.S. Pat. No. 3,692,354. This delta stake configuration saved on material cost while strengthening the stake arrangement and increasing its supporting capacity. This delta stake concept further lends itself to adaptation to meet the changing needs of the industry, as evidenced by the improved delta truck stake arrangement disclosed in Tuerk, U.S. Pat. No. 4,076,601.

Over the years, much less interest has been shown in developing bed enclosure arrangements for the smaller pickup trucks having raised side walls and much smaller load capacity. However, with the recent surge of interest in pickup trucks and four-wheel drive vehicles for family use, and with their ever burgeoning use by suburban and rural residents, the need exists for a lightweight, easy-handling and versatile stake arrangement for enclosing pickup truck beds.

However, problems exist with developing an effective and practicable pickup truck stake arrangement which are not encountered in arrangements for the larger flatbed highway vehicles. For example, standardization has not reached the pickup truck industry. Although the majority of pickup trucks do include a plurality of pockets around the opposing side walls of the truck bed, the layouts, or patterns, of these pockets are by no way uniform. In addition, the differing lengths of pickup truck beds pose a significant problem because a particular stake and panel arrangement may fit one type of pickup truck while being too short or too long, and thus totally unacceptable for many others. Another problem is that pickup truck owners may either need to enclose the entire bed, including the side walls, or just the inside of the pickup truck bed itself, depending upon the specific use contemplated.

Examples of the work accomplished to date in the pickup truck area are Giles, U.S. Pat. No. 2,690,351, and Magers, U.S. Pat. No. 3,455,573. Magers merely discloses a tie-down unit for use in the stake pockets of pickup trucks serving to fasten down loads exceeding that of the truck bed itself. Giles, on the other hand, discloses a knock-down type cover for vehicles such as pickup trucks in which feet are removably inserted in the post sockets of the side walls of the pickup truck body.

Therefore, the need has and continues to exist for a stake design and arrangement effective to satisfy the varying needs of pickup truck owners. This stake design and arrangement must be lightweight and easily handled. It must be structurally sturdy and capable of supporting enclosure panels, or walls, as well as a tarpaulin roof if needed. It must be versatile to adapt for enclosing pickup truck beds of differing length and of differing pocket layout, and should further be versatile to allow enclosing either of the truck bed and side walls together or just of the inside truck bed alone.

SUMMARY OF THE INVENTION

One aspect of the present invention comprises a truck stake suitable for use in enclosing the bed of a pickup truck, including a delta truck stake having a tapered bottom end removably seatable in a side wall pocket of a pickup truck bed, a plurality of dovetail slots in the wide wall of said delta stake, said slots being parallel and extending along a portion of the length thereof, a panel-receiving and supporting bracket defining a lateral groove therein for receipt and support of a wall enclosure panel and a dovetail ridge extending along a portion of the length of said bracket and slidably and interchangeably received within the dovetail slots in said delta stake.

The above embodiment constitutes a major improvement in stake design for use in pickup trucks. By providing the panel-receiving and supporting bracket with a ridge interchangeable between the several slots in the stake itself, the position of the panel-receiving groove can be varied with respect to the stake thereby providing the versatility needed to accommodate differing lengths of pickup and other truck beds. In addition, this same versatility in groove positioning aids in adapting the particular stake arrangement to beds of differing side wall pocket patterns, or layouts, and thus is an important improvement over the prior art.

In one mode of practicing this above embodiment, two parallel dovetail ridges are provided on the supporting wall of the bracket for added strength, these ridges being interchangeably received within adjacent pairs of the parallel and equally spaced slots in the delta stake. The bracket itself defines both a lateral and a transverse groove for receipt and support of two wall panels. These grooves may or may not have a common wall with the transverse groove either opening in the direction of, or opposite of, the dovetail ridges thereby greatly adding to the versatility of the stake arrangement. The inner surface of one of the dovetail slots in the delta stake is also concave and defines a saddle for support of a tarpaulin rod thereon. A plastic plug is further press-fitted into the tapered bottom end of the delta stake, the plug having a projection extending therefrom adapted for insertion into the drain hole in the bottom of a truck bed pocket to aid in supporting and stabilizing the delta stake therein.

A second aspect of the present invention constitutes an improved truck stake design comprising a length of rigid elongated material having a generally constant delta shape in longitudinal cross section including a wide wall, said cross section along at least a portion of said length further including a first rigid wall secured to and forming a generally coplanar outward extension of the wide wall of the delta-shaped cross section, a U-shaped wall configuration defining a first panel-receiving groove, said U-shaped configuration being secured to said first wall with the groove therein opening generally perpendicularly to said first wall, and a L-shaped wall configuration with one leg thereof being secured to and extending generally perpendicularly from said first wall and the wide wall of the delta-shaped cross section, said L-shaped configuration defining a second panel-supporting groove opening generally perpendicularly to said first groove.

Several modes exist for practicing this second aspect of the present invention. First, the bottom wall of said U-shaped configuration can be constructed integral with and coplanar with said first wall. In addition, the one leg of said L-shaped configuration can form a common wall with one side wall of said U-shaped configuration, with the other leg of said L-shaped configuration being integral with and coplanar with the bottom wall of said U-shaped configuration. The first wall may also be either integral with the wide wall of the delta-shaped cross section or secured thereto by a dovetail ridge and slot arrangement.

One object of the present invention is to provide an effective and versatile truck stake design and arrangement suitable for use in enclosing the beds of a great variety of pickup trucks.

Another object of the present invention is to provide an improved two-part truck stake design and arrangement providing the interchangeability and versatility required to adapt for use in enclosing pickup truck beds.

Related objects and advantages of the present invention will be apparent from the following description.

BRIEF DESCRIPTION OF THE DRAWINGS

FIG. 1 is a part-sectional view of a pickup truck outfitted with a delta stake arrangement according to the preferred embodiment for enclosing the truck bed.

FIG. 2 is an end view of a delta stake.

FIG. 3 is a perspective view of a portion of the delta stake of the preferred embodiment.

DESCRIPTION OF THE PREFERRED EMBODIMENTS

Figure 4:
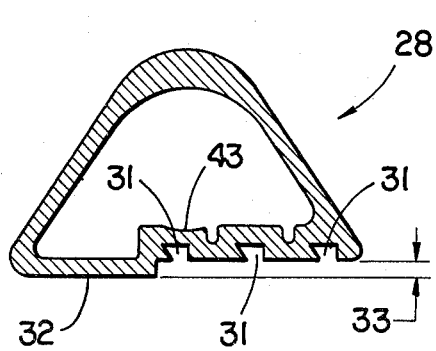
FIG. 4 is a cross-sectional view of the delta stake in FIG. 3 taken along line 4—4.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring specifically to FIG. 1, therein is depicted a partial view of a pickup truck 10 which includes a cab portion 11 and cargo portion 12. The cargo portion has a horizontal bed 13 and opposing side walls 14 and reciprocable back gate 15 defining the cargo compartment. The opposing side walls 14 further include a number of generally rectangular-shaped pocket brackets 16 spaced apart along the upper edge or shoulder 17 of the walls.

Pickup truck 10 in FIG. 1 is further equipped with a bed enclosure arrangement 18 including a plurality of wall enclosure panels 21 received in and supported by a plurality of delta stakes 22. Each stake 22 comprises a length of rigid elongated material having a generally constant delta shape in longitudinal cross section in accordance with the preferred embodiment of the present invention as further set forth hereinbelow.

Referring now to FIG. 2, therein is depicted the standard delta stake configuration 23 according to applicant's prior invention disclosed in U.S. Pat. No. 3,692,354. The delta, or triangular, configuration of stake 23 has three corners 24, 25 and 26 substantially thicker than the walls 27. The bottom, or wide, wall 29 as viewed in FIG. 2 is the widest of the three walls being approximately 3.250 inches in width as set forth in my prior patent. In this regard, U.S. Pat. No. 3,692,354 and U.S. Pat. No. 4,067,601, which also issued to me on an improved delta truck stake arrangement, and hereby expressly incorporated herein by reference as to all relevant aspects and information concerning my delta stake and delta T stake designs. In addition, the terms "delta" and "delta-shaped configuration" as used herein are meant to define a stake cross section or configuration consistent with the limitations and descriptions in my two previous U.S. patents incorporated herein by reference.

Referring now to FIGS. 3 and 4, therein is depicted a delta stake 28 comprising one part of the two-part delta stake arrangement of the preferred embodiment of my present invention. Specifically, three dovetail slots or grooves 31 have been formed in the wide wall 32 of the stake 28. These slots are parallel and equally spaced extending the entire length of stake 28.

Figure 7:
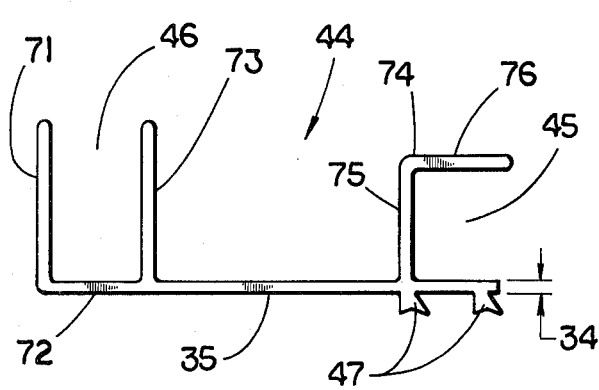
FIG. 7 is an end view of one panel-receiving and supporting bracket of the preferred embodiment.
Figure 8:
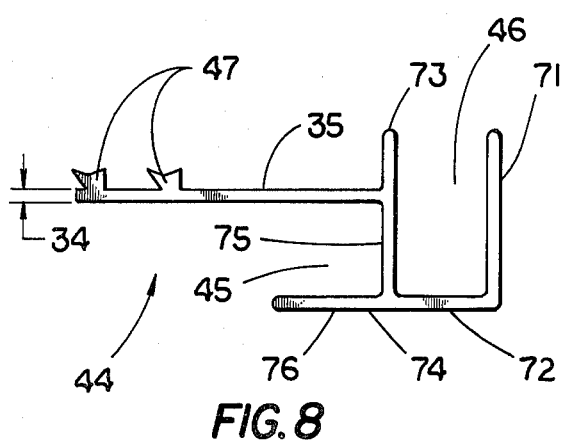
FIG. 8 is an end view of a second panel-receiving and supporting bracket of the preferred embodiment.
Figure 18:
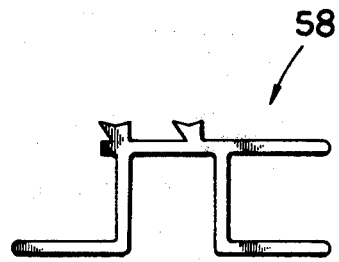
FIG. 18 is an end view of another panel-receiving and supporting bracket of the preferred embodiment.

In the preferred embodiment of my present invention, the slotted portion of wide wall 32 is further inset an amount depicted by numeral 33 in FIG. 4, this amount being equal to the width 34 of the supporting wall 35 of each panel-receiving and supporting bracket, as depicted in FIGS. 7, 8 and 18 and further discussed hereinbelow. In this way, wide wall 32 of stake 28 and supporting wall 35 of each bracket form a generally planar surface 36 for supporting a wall enclosure panel 21, as better depicted in FIGS. 9 and 10.

Figure 5:
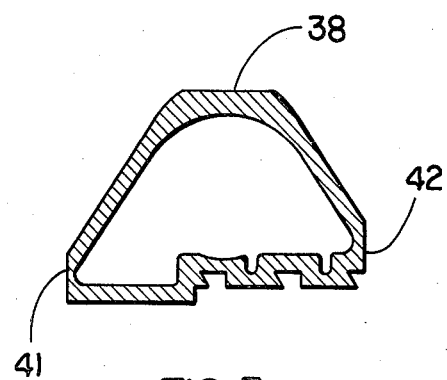
FIG. 5 is a cross-sectional view of the delta stake in FIG. 3 taken along line 5—5.
Figure 6:
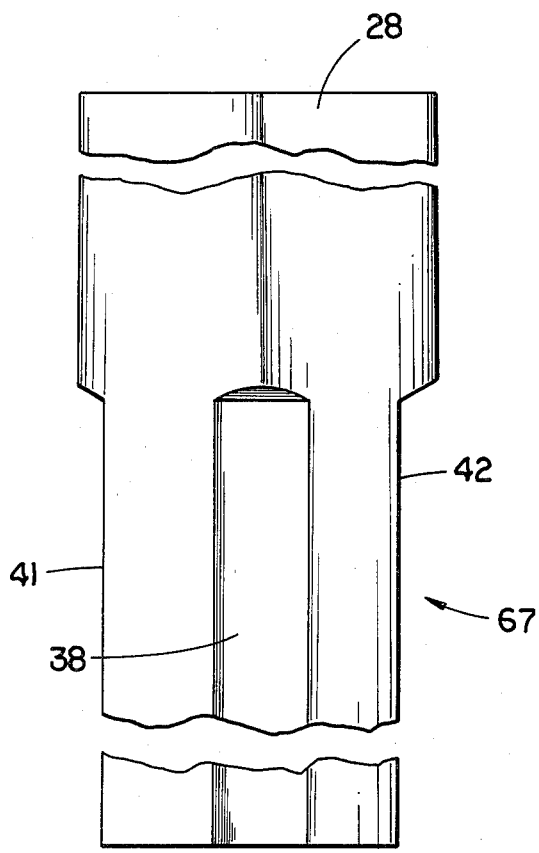
FIG. 6 is a plan view of the delta stake in FIG. 3 taken along line 6—6.

Similar to the delta stakes of my previous inventions, each delta stake 28 of the preferred embodiment herein has a tapered bottom end portion 37 which can be removably seated in the side wall pockets 16 of pickup truck 10. As better shown in FIGS. 5 and 6, this tapered bottom end portion is accomplished by trimming off an amount of the thickened corners 38, 41 and 42 of delta stake 28 sufficient to fit within the side wall pockets. The exact amount of trimming needed will, of course, vary according to many factors, not the least of which are the specific dimensions of both the delta stake and the side wall pockets on the pickup truck.

A further feature incorporated into delta stake 28 of the preferred embodiment concerns a means for receiving and supporting the end of a tarpaulin bow or rod (not shown) in the event it is desired to totally enclose the pickup truck bed 13. In preferred stake 28, this means is accomplished by forming a concave inner surface 43 into the centermost positioned dovetail slot 31 slot in the wide wall 32 of each stake, as depicted in FIG. 3. This concave inner surface 43 defines a saddle for receipt and support of a tarpaulin bow or rod thereon.

Figure 12:
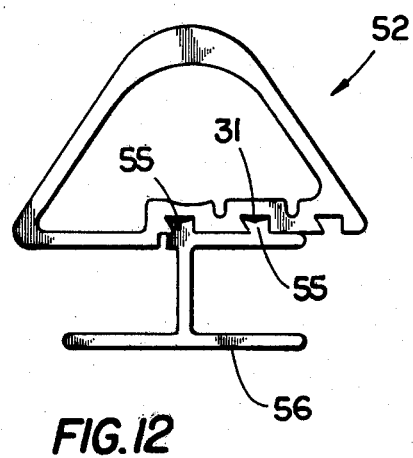
FIG. 12 is an end view of another delta stake and bracket arrangement according to the preferred embodiment.

Referring now to FIGS. 7 and 8, therein are depicted two different configurations for wall enclosure panel-receiving and supporting brackets 44 comprising the second part of the delta stake arrangement of the preferred embodiment. Each bracket 44 of the preferred embodiment includes a first, or supporting, wall 35. Each bracket 44 further defines a lateral groove 45 and transverse groove 46 therein for receipt and support of the vertical edge of a wall enclosure panel 21 for pickup truck bed 13. In this regard, the terms "lateral" and "transverse" as used in this specification and in the claims attached hereto are meant to indicate the relative direction of the opening of a bracket groove with respect to the supporting wall 35 of each bracket. A "lateral" groove is one which opens parallel to supporting wall 35 using the supporting wall as at least a partial support for the panel 21. A "transverse" groove, on the other hand, is one which opens normal, or perpendicular to this supporting wall 35. Accordingly, a single bracket 44 defining both a lateral and a transverse groove therein may be termed a "corner" bracket because it permits the receipt and support of wall panels at a right angle to each other. A bracket defining two lateral grooves, as depicted in FIG. 12, may be termed a "center wall" bracket permitting the receipt and support of two panels parallel to one another and in end-to-end relation.

Figure 9:
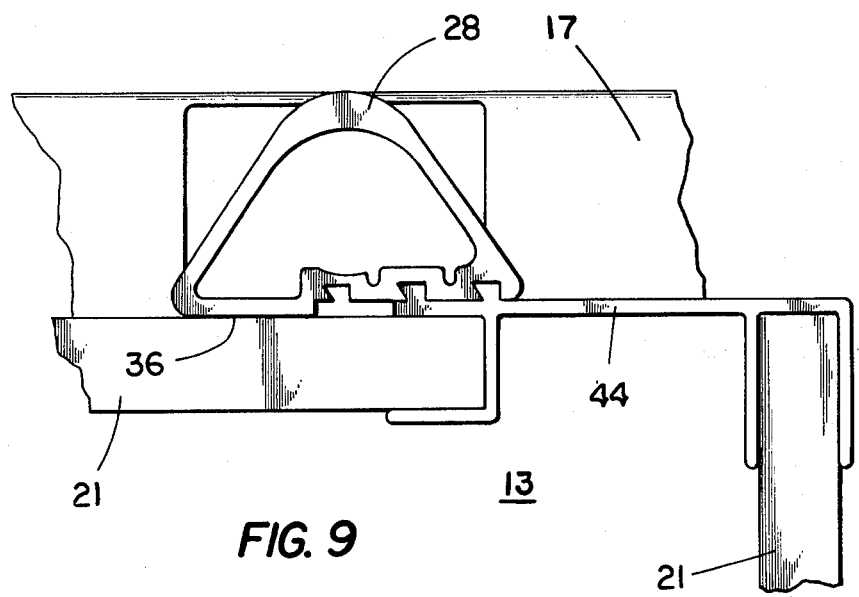
FIG. 9 is a top view of a delta stake, bracket and panel arrangement enclosing a pickup truck bed according to the preferred embodiment.
Figure 10:
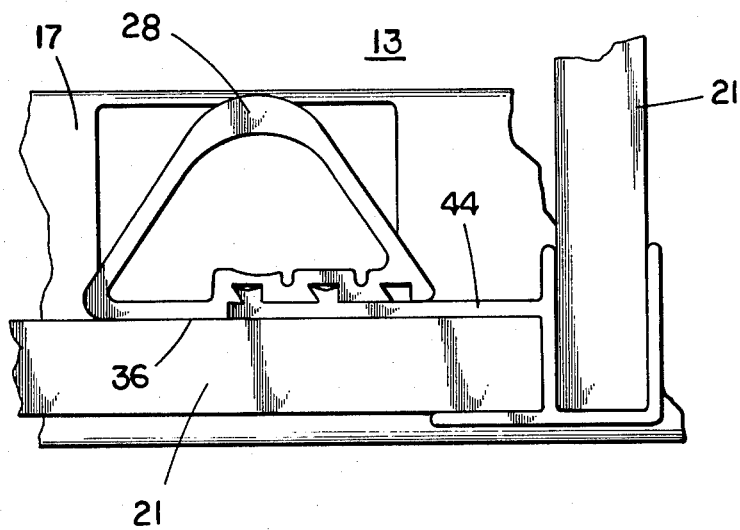
FIG. 10 is a top view of a second delta stake, bracket and panel arrangement enclosing a pickup truck bed according to the preferred embodiment.

In use, as depicted in FIGS. 9 and 10, this first wall 35 of each bracket is secured to and forms a generally coplanar outward extension of the wide wall 32 of the delta-shaped stake configuration. The transverse groove 46 in each stake is defined by a U-shaped wall configuration 71 which is secured to first wall 35 in one of several ways. For example, as shown in FIG. 7, the bottom wall 72 of configuration 71 can be formed integral with and coplanar with this first wall 35. In contrast, FIG. 8 depicts a possible alternative attachment in which first wall 35 is secured to one side wall 73 of this U-shaped configuration. In either case, the transverse groove opens generally perpendicularly to the first wall and the generally planar surface formed by this first wall and the wide wall of the delta-shaped cross section.

The lateral groove 45 in each delta stake of the preferred embodiment is defined by an L-shaped wall configuration 74 which has one leg 75 secured to and extending generally perpendicularly from the first wall 35 and wide wall 32 of the delta configuration. As above, the specific attachment of this L-shaped configuration 74 can very greatly. For example, the one leg 75 can be secured parallel to but spaced apart from the closest side wall 73 of U-shaped configuration 71, as depicted in FIG. 7. This is again contrasted by the alternate construction in FIG. 8 in which leg 75 and side wall 73 form a common wall with the other leg 76 of this L-shaped configuration being both integral with and coplanar with the bottom wall 72 of this U-shaped configuration. In either case, the lateral groove opens generally perpendicularly to the first groove formed by the U-shaped configuration.

The supporting wall 35 of each bracket 44 of the preferred embodiment further includes a pair of dovetail ridges 47. These ridges are parallel, spaced apart and extend the entire length of the bracket.

An important feature of this embodiment of my invention, as set forth hereinabove, is the provision of means for enclosing pickup truck beds of differing length and differing pocket layout or pattern. This feature is accomplished in two ways in my preferred embodiment.

First, as mentioned above and depicted in FIGS. 7, 8, 12 and 18, various alternative configurations for brackets 44 can be simply and easily fashioned varying both the relative positions of the grooves along supporting wall 35 and the length of the supporting wall itself. In this way, access to two or more bracket configurations provides an individual with increased adaptability for enclosing pickup truck beds of differing length and differing pocket layout.

Second, and more importantly, the pair of dovetail ridges 47 on all brackets 44 are both slidably and interchangeably received within adjacent pairs of the dovetail slots 31 in each delta stake 28. As better shown in FIGS. 9, 10 and 12, this interchangeability of the ridges within adjacent pairs of slots in each stake provides great variation to the delta stake arrangement of the preferred embodiment of my invention.

In this regard, although three equally spaced slots and two matching ridges are provided in the preferred delta stake arrangement herein, it is clearly contemplated within the scope and coverage of my invention that these numbers can increase or decrease so long as the interchangeability and variability of the arrangement is maintained. For example, it is contemplated that a single dovetail ridge on each bracket 44 could provide sufficient structural support for the wall panels 21 when slidably received within a matching dovetail slot in the delta stake 28. Limiting each bracket 44 to a single ridge would increase even more the arrangement's versatility and adaptability by increasing the possible stake and bracket positions. By then increasing the number of slots to fill the complete wide wall 32 of each stake, the interchangeability and versatility of the final arrangement would be greatly enhanced.

Figure 11:
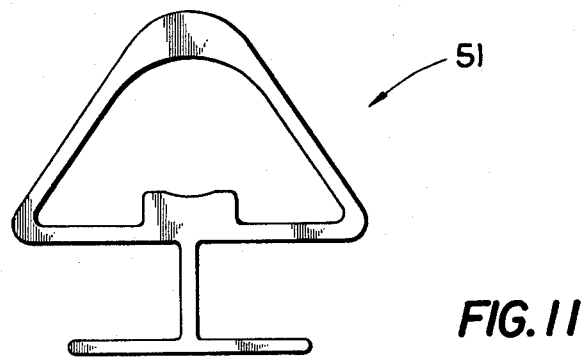
FIG. 11 is an end view of a delta T stake.

Referring now to FIGS. 11 and 12, therein are depicted two center wall delta stake arrangements 51 and 52 suitable for use at positions 53 and 54 in the pickup truck bed enclosure arrangement 18 depicted in FIG. 1. Specifically, the delta T stake in FIG. 11 is fully disclosed in applicant's prior patents expressly incorporated herein by reference. The two-part delta stake arrangement 52 in FIG. 12, on the other hand, is in accordance with the preferred embodiment of the present invention, including a pair of dovetail ridges 55 on bracket 56 interchangeably and slidably received within adjacent pairs of the dovetail slots 31 in delta stake 28, as previously depicted in FIG. 4.

The center wall stake arrangement in FIG. 12 thus provides the versatility discussed above with respect to the corner positions, as depicted in FIGS. 9 and 10. This versatility is again accomplished by the interchangeability of the ridges 55 in slots 31 and by possible modifications in the particular configuration of bracket 56. For example, by constructing a bracket 58 having no common wall for the lateral grooves, as depicted in FIG. 18, it is possible to substantially lengthen the enclosure capabilities of the truck stake arrangement.

Figure 13:
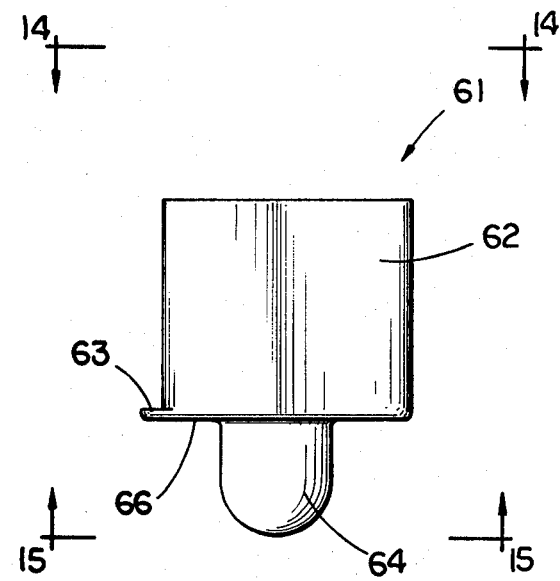
FIG. 13 is a plan view of the plastic end plug of the preferred embodiment.
Figure 15:
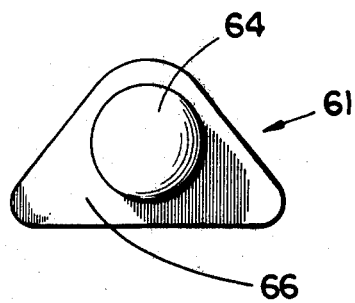
FIG. 15 is an end view of the plastic plug in FIG. 13 taken along line 15—15.
Figure 14:
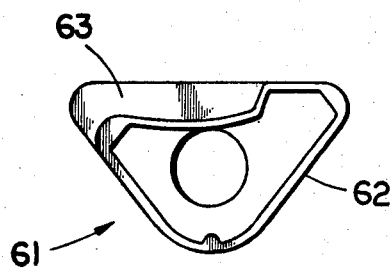
FIG. 14 is a part-sectional end view of the plastic plug in FIG. 13 taken along line 14—14.

Referring now to FIGS. 13–15, various views of a plastic plug 61 are depicted therein. This plug is triangular in axial cross section, and includes an elongated wall portion 62 and overhanging lip or flange 63. In the delta stake arrangement of the preferred embodiment, a plastic plug 61 is press-fitted into the tapered bottom end of each delta stake 28 with the overhanging lip resting against the bottom end of the stake and with nipple projection 64 extending outwardly therefrom.

Figure 16:
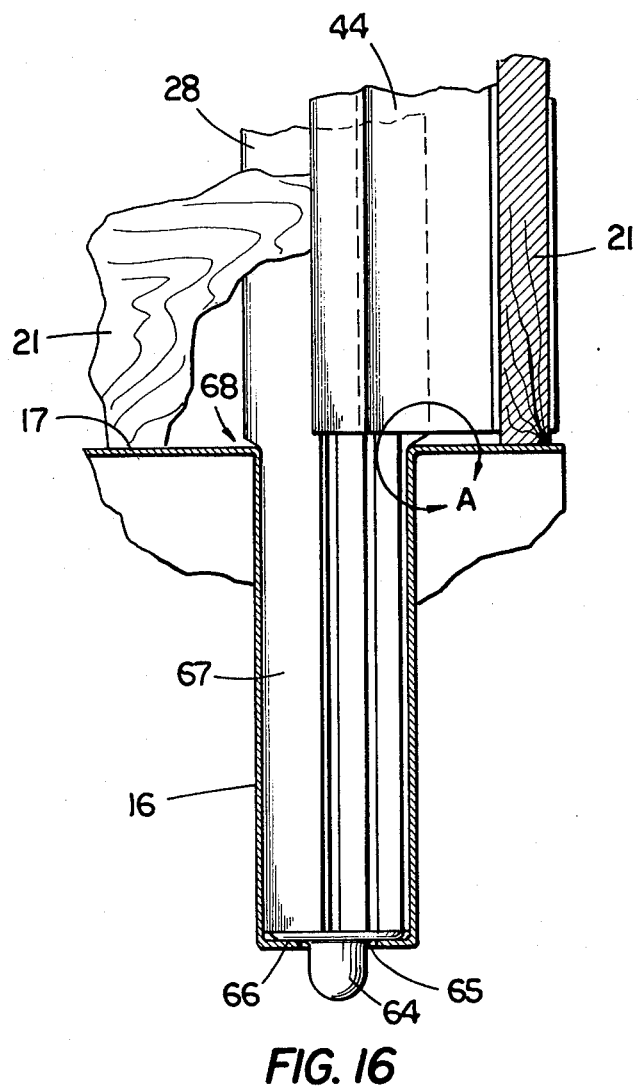
FIG. 16 is a part-sectional view of a delta stake, bracket and panel arrangement of the preferred embodiment seated in a pocket on a side wall of a pickup truck.

The great majority of pickup trucks on the market today have side wall pockets for insertion of stakes or other supports. Similarly, it is also common for these pickup trucks to have a drain hole 65 in the bottom of each pocket 16 as shown in FIG. 16. This drain hole permits the escape of water, snow and dirt from the pocket thereby preventing a buildup of such material in the pocket itself. In the preferred embodiment, projection 64 of plug 61 is adapted for insertion into this drain hole 65 at the bottom of each pocket bracket 16. In this way, the projection helps to support and stabilize the delta stake arrangement in the pocket bracket. In addition, as shown in FIG. 16, lip 63 prevents the plug from being shoved completely into the delta stake thereby providing surface 66 slightly below the end of the stake which prevents metal-to-metal contact at the bottom of each pocket 16.

Figure 17:
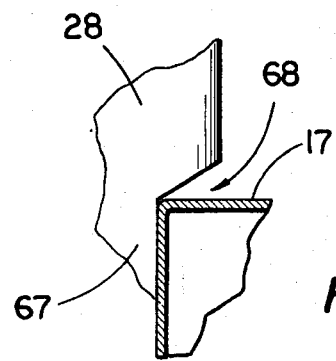
FIG. 17 is an enlarged view of area A in FIG. 16.

Furthermore, the trimmed edge portions 67 of each stake 28 of the preferred embodiment are relieved an amount indicated by numeral 68 in FIG. 17. In this way, the weight on each stake 28 is supported in the pocket by plastic plug 61 and not on the shoulders 17 thereby avoiding the scraping or other damage that often results from metal-to-metal contact. Instead, only the wall enclosure panels 21 rest upon the shoulders 17 of the pickup truck bed, as also shown in FIG. 16.

Another feature of versatility in the preferred delta stake arrangement of the present invention concerns the area to be enclosed on the pickup truck bed. For example, in certain situations, the pickup truck owner may want to enclose only the inside of the bed whereas on other occasions, he may want to enclose the entire pickup truck bed including the side walls thereof. In the preferred embodiment, the ability to accommodate such variations is provided by varying the configuration of brackets 44 and, in particular, the direction in which the transverse grooves open with respect to the dovetail ridges 47 on supporting wall 35 of each bracket. For example, in FIG. 9 transverse groove 46 opens in the direction of ridges 47. Each stake 28 is then positioned with its wide wall 32 directed outwardly from bed 13 with panels 21 resting along the outer edge of shoulder 17. In this way, the entire pickup truck bed including the side walls thereof are enclosed for cargo transportation.

On the other hand, if transverse groove 46 opens in the direction opposite ridges 47, the arrangement in FIG. 10 is thereby created. Each stack 28 is then reversed with its wide wall 32 directed inwardly toward the truck bed and with panels 21 either resting on the inside edge of shoulder 17 or extending along the inside of side walls 14 not resting on their upper shoulder. Only the inside of the pickup truck bed 13 is thereby enclosed.

In the arrangement of either FIG. 9 of FIG. 10, the preferred center wall delta stake arrangements as shown in FIGS. 11 and 12 can be easily adapted for the desired enclosure by merely changing the position and direction of each center wall stake in its pocket 16.

As specifically disclosed hereinabove, the two-part delta stake arrangement and improved truck stake design of the preferred embodiment provide a substantial improvement over present and prior art arrangements for enclosing pickup truck beds. The versatility and adaptability of the above embodiment permits its use with a great variety of pickup trucks having beds of differing length and differing pocket layout or pattern.

In further aid of this versatility, the specific composition and dimensions of the two-part delta stake and bracket arrangement described above can vary greatly in response to many factors. In the preferred embodiment, the delta stakes and brakets are an aluminum alloy fabricated by conventional extrusion techniques. The wide wall 32 of each preferred stake 28 is 5.9 cm in length, and the vertical height of each stake 28 is 3.8 cm. Each stake 28 is 60 cm in overall length with a tapered bottom end portion 37 that is 16 cm. long. The preferred brackets 44 then extend the entire length of the stakes except for these tapered bottom end portions which fit within the side wall pockets of the pickup truck bed.

Figure 19:
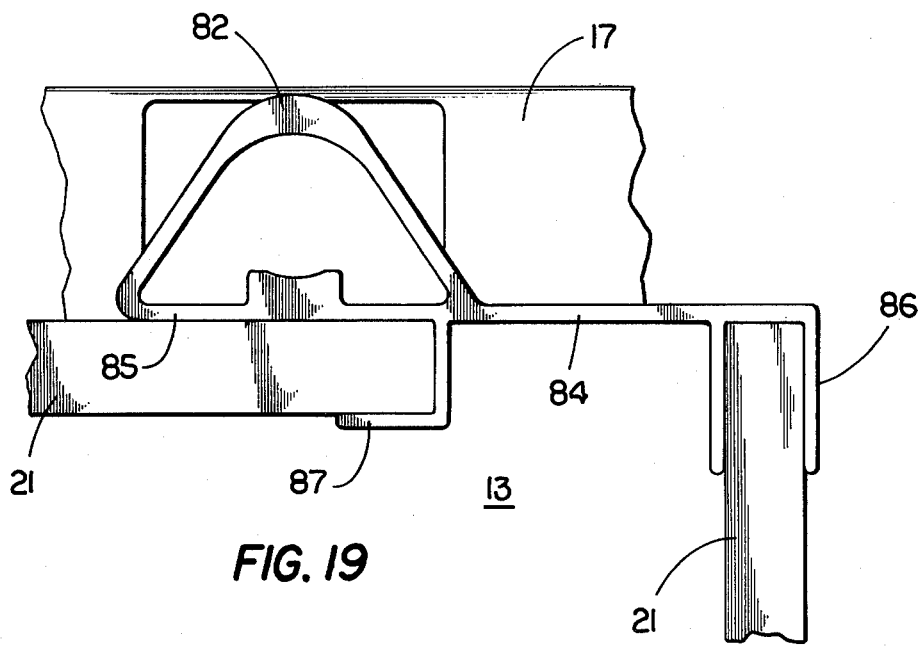
FIG. 19 is a top view of an integral delta stake and bracket arrangement enclosing a pickup truck bed according to the second embodiment of the present invention.
Figure 20:
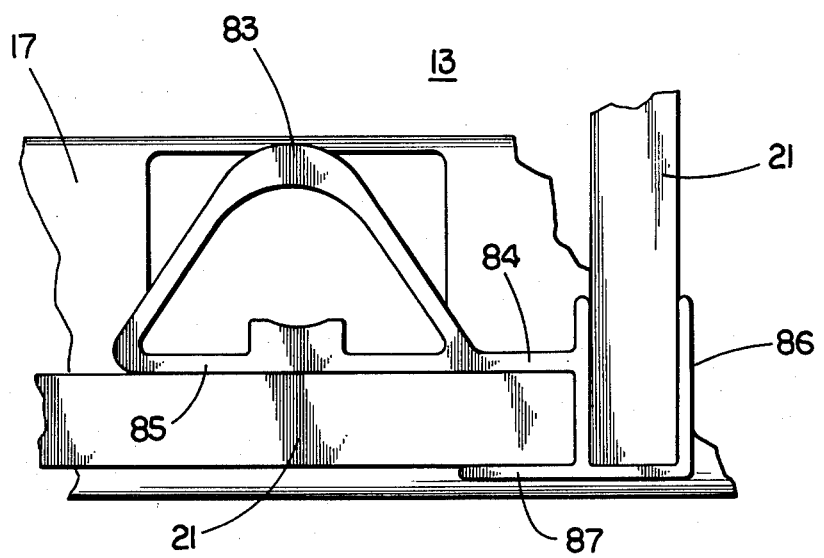
FIG. 20 is a top view of a second integral delta stake and bracket arrangement enclosing a pickup truck bed according to the second embodiment of the present invention.

A second embodiment of the present invention comprises an integral one-piece truck stake and bracket design consistent with the above-stated goals of versatility and adaptability, and incorporating many of the features already described in connection with the preferred embodiment. Specifically, FIGS. 19 and 20 depict two integral stake and bracket configurations 82 and 83 identical to those depicted in FIGS. 9 and 10 except for the omission of the connecting dovetail ridge and slot arrangements. Each esign includes a first rigid wall 84 integral with and forming a generally coplanar outward extension of the wide wall 85 of the delta-shaped stake. Each design also includes both a U-shaped wall configuration 86 and a L-shaped wall configuration 87, both properly secured and defining a transverse and a lateral panel-receiving groove, respectively.

In this second embodiment, versatility is retained by the endless possibility of variation in wall attachment and positioning, and in the very length of first wall 84. In addition, this integral forming of the stake and bracket designs, whether by extrusion or other appropriate means, provides the added advantage of substantially decreased expense over that required in forming matching interwall dovetail ridges and slots.

Figure 21:
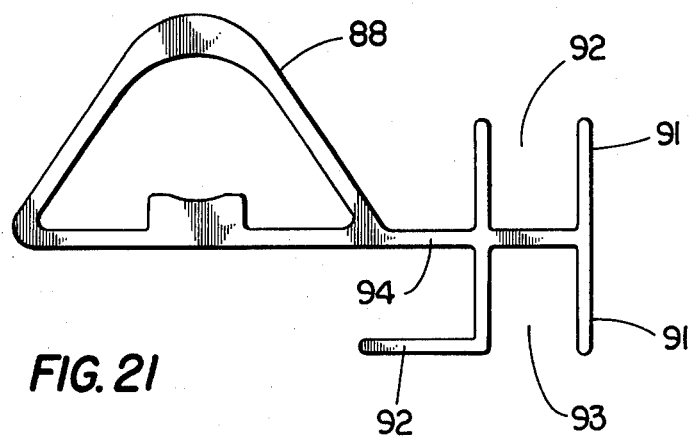
FIG. 21 is a top view of a third integral delta stake and bracket design according to the second embodiment of the present invention.

A still further example of the versatility of this second embodiment of my invention is depicted in FIG. 21. The integral stake and bracket configuration 88 depicted therein is a modification of the designs in FIGS. 19 and 20 in which two U-shaped wall configuration 91 are used in addition to the one L-shaped configuration 92. A transverse groove 93 is then provided in either direction generally perpendicular to first wall 94. By merely rotating stake 88 in its particular side wall pocket, this one stake design is adaptable to enclose either the truck bed and side walls together, or just the inside truck bed alone.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A truck stake arrangement suitable for use in enclosing the bed of a pickup truck, comprising:
   (a) a delta truck stake having a tapered bottom end removably seatable in the side wall pockets of a pickup truck bed;
   (b) a plurality of dovetail slots in the wide wall of said delta stake, said slots being parallel and extending along a portion of the length thereof;
   (c) a panel-receiving and supporting bracket defining a lateral groove therein for receipt and support of a wall enclosure panel; and
   (d) a dovetail ridge extending along a portion of the length of said bracket and slidably and interchangeably received within said dovetail slots in said delta stake.

2. The arrangement of claim 1 wherein said bracket further defines a transverse groove therein for receipt and support of a second wall enclosure panel.

3. The arrangement of claim 2 wherrein the transverse groove in said bracket opens in the direction of said dovetailed ridge for enclosing a truck bed including the side walls thereof.

4. The combination, comprising:
   (a) a pickup truck having a plurality of rectangular-shaped pockets around the raised side walls of the bed thereof;
   (b) a plurality of wall panels to enclose the pickup truck bed; and
   (c) a plurality of said truck stake arrangements of claim 1 removably seated in the pockets around the pickup truck bed and supporting said wall panels therein.

5. A truck stake arrangement suitable for use in enclosing the bed of a pickup truck, comprising:
   (a) a delta truck stake having a tapered bottom end removably seatable in the side wall pockets of a pickup truck bed;
   (b) a plurality of dovetail slots in the wide wall of said delta stake, said slots being parallel and extending along a portion of the length thereof;
   (c) a panel-receiving and supporting bracket defining a lateral groove therein for receipt and support of a wall enclosure panel;
   (d) a dovetail ridge extending along a portion of the length of said bracket and slidably and interchangeably received within said dovetail slots in said delta stake; and
   (e) a plastic plug press-fitted into the tapered bottom end of said delta stake, said plug having a projection extending therefrom adapted for insertion into the drain hole in the bottom of a truck bed pocket to stabilize said delta stake therein.

6. A truck stake arrangement suitable for use in enclosing the bed of a pickup truck, comprising:
   (a) a delta truck stake having a tapered bottom end removably seatable in the side wall pockets of a pickup truck bed;
   (b) a plurality of dovetail slots in the wide wall of said delta stake, said slots being parallel and extending along a portion of the length thereof;
   (c) a panel-receiving and supporting bracket defining a lateral groove therein for receipt and support of a wall enclosure panel; and
   (d) a dovetail ridge extending along a portion of the length of said bracket and slidably and interchangeably received within said dovetail slots in said delta stake, wherein the slotted portion of the wide wall of said delta stake is inset an amount equal to the width of the ridged wall of said bracket, the slotted and ridged walls when joined forming a planar surface for support of a wall panel thereon.

7. A truck stake arrangement suitable for use in enclosing the bed of a pickup truck, comprising:
   (a) a delta truck stake having a tapered bottom end removably seatable in the side wall pockets of a pickup truck bed;
   (b) a plurality of dovetail slots in the wide wall of said delta stake, said slots being parallel and extending along a portion of the length thereof;
   (c) a panel-receiving and supporting bracket defining a lateral groove therein for receipt and support of a wall enclosure panel; and
   (d) a dovetail ridge extending along a portion of the length of said bracket and slidably and interchangeably received within said dovetail slots in said delta stake, wherein said bracket includes two parallel dovetail ridges extending along a portion of the length thereof and being slidably and interchangeably received within adjacent paris of said dovetail slots in said delta stake.

8. The arrangement of claim 7 wherein said delta stake includes three parallel and equally spaced dovetail slots therein.

9. The arrangement of claim 7 wherein the slotted portion of the wide wall of said delta stake is inset an amount equal to the width of the ridged wall of said bracket, the slotted and ridged walls when joined forming a planar surface for support of a wall panel thereon.

10. The arrangement of claim 9 wherein said bracket further defines a transverse groove therein for receipt and support of a second wall panel.

11. The arrangement of claim 10 wherein the lateral and transverse grooves in said bracket have no common wall.

12. The arrangement of claim 10 wherein the lateral and transverse grooves in said bracket have a common wall.

13. The arrangement of claim 9 wherein the inner surface of one of said dovetail slots in said delta stake is concave and defines a saddle for support of a tarpaulin rod thereon.

14. The arrangement of claim 13 additionally comprising a plastic plug press-fitted into the tapered bottom end of said delta stake, said plug having a projection extending therefrom adapted for insertion into the drain hole in the bottom of a truck bed pocket to stabilize said delta stake therein.

15. A truck stake arrangement suitable for use in enclosing the bed of a pickup truck, comprising:
(a) a delta truck stake having a tapered bottom end removably seatable in the side wall pockets of a pickup truck bed;
(b) a plurality of dovetail slots in the wide wall of said delta stake, said slots being parallel and extending along a portion of the length thereof;
(c) a panel-receiving and supporting bracket defining a lateral groove therein for receipt and support of a wall enclosure panel; and
(d) a dovetail ridge extending along a portion of the length of said bracket and slidably and interchangeably received within said dovetail slots in said delta stake, wherein said bracket further defines a transverse groove therein for receipt and support of a second wall enclosure panel, wherein the transverse groove in said bracket opens in the direction of said dovetailed ridge for enclosing a truck bed including the side walls thereof.

16. The combination, comprising:
(a) a pickup truck having a plurality of rectangular-shaped pockets around the raised side walls of the bed thereof;
(b) a plurality of wall panels to enclose the pickup truck bed; and
(c) a plurality of said truck stake arrangements of claim 7 removably seated in the pockets around the pickup truck bed and supporting said wall panels therein, said brackets defining a second groove therein for receipt and support of a second of said wall panels.

17. The combination, comprising:
(a) a pickup truck having a plurality of rectangular-shaped pockets around the raised side walls of the bed thereof;
(b) a plurality of wall panels to enclose the pickup truck bed; and
(c) a plurality of said truck stake arrangements of claim 14 removably seated in the pockets around the pickup truck bed and supporting said wall panels therein, said wall panels resting upon the upper shoulder of the side walls of said pickup truck.

18. A truck stake suitable for use in enclosing the bed of a pickup truck, comprising:
a length of rigid elongated material having a generally constant delta shape in longitudinal cross section including a wide wall, said cross section along at least a portion of said length further including:
(a) a first rigid wall secured to and forming a generally coplanar outward extension of the wide wall of the delta-shaped cross section;
(b) a U-shaped wall configuration defining a first panel-supporting groove, said U-shaped configuration being secured to said first wall with the groove therein opening generally perpendicularly to said first wall; and
(c) an L-shaped wall configuration with one leg thereof being secured to and extending generally perpendicularly from said first wall and the wide wall of the delta-shaped cross section, said L-shaped configuration defining a second panel-supporting groove opening generally perpendicularly to said first groove.

19. The truck stake of claim 18 wherein said first wall is formed integral with the wide wall of the delta-shaped cross section.

20. The truck stake of claims 18 or 19 wherein the bottom wall of said U-shaped configuration is integral with and coplanar with said first wall.

21. The truck stake of claims 18 or 19 wherein the one leg of said L-shaped configuration is parallel to and spaced apart from the side walls of said U-shaped configuration.

22. The truck stake of claims 18 or 19 wherein the one leg of said L-shaped configuration forms a common wall with one side wall of said U-shaped configuration, the other leg of said L-shaped configuration being integral with and coplanar with the bottom wall of said U-shaped configuration.

23. The truck stake of claims 18 or 19 additionally comprising a second U-shaped wall configuration, said U-shaped configurations having a common bottom wall integral with and coplanar with said first wall.

* * * * *